United States Patent
Miyata (10) Patent No.: US 8,412,267 B2
(45) Date of Patent: Apr. 2, 2013

(54) COMMUNICATION CONTROLLING METHOD, COMPUTER READABLE MEDIUM, AND COMMUNICATION DEVICE

(75) Inventor: Yuji Miyata, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 13/170,656

(22) Filed: Jun. 28, 2011

(65) Prior Publication Data

US 2012/0021801 A1   Jan. 26, 2012

(30) Foreign Application Priority Data

Jul. 26, 2010  (JP) ................................. 2010-167162

(51) Int. Cl.
*H04M 1/00* (2006.01)
(52) U.S. Cl. ..................... 455/556.1; 455/557
(58) Field of Classification Search .................. 455/41.3, 455/551, 557, 556.1, 552.1, 550.1; 358/1.15
See application file for complete search history.

(56) References Cited

U.S. PATENT DOCUMENTS

| | | | |
|---|---|---|---|
| 7,286,251 B2 | 10/2007 | Tomida et al. | |
| 7,616,337 B2 * | 11/2009 | Hayashi | 358/1.15 |
| 7,657,282 B2 | 2/2010 | Suzuki et al. | |
| 2002/0054345 A1 | 5/2002 | Tomida et al. | |
| 2002/0065873 A1 | 5/2002 | Ishizuka | |
| 2004/0184073 A1 | 9/2004 | Shahindoust | |
| 2004/0184100 A1 | 9/2004 | Shahindoust | |
| 2004/0204038 A1 | 10/2004 | Suzuki et al. | |
| 2007/0167187 A1 * | 7/2007 | Rezvani et al. | 455/550.1 |
| 2008/0004075 A1 * | 1/2008 | Horton | 455/557 |
| 2010/0309504 A1 * | 12/2010 | Partridge et al. | 358/1.15 |
| 2011/0063663 A1 * | 3/2011 | Kim et al. | 358/1.15 |
| 2011/0212746 A1 * | 9/2011 | Sarkar et al. | 455/552.1 |
| 2011/0216349 A1 * | 9/2011 | McCorkindale et al. | 358/1.15 |

FOREIGN PATENT DOCUMENTS

| | | |
|---|---|---|
| JP | 2001-36937 | 2/2001 |
| JP | 2002-175163 | 6/2002 |

(Continued)

OTHER PUBLICATIONS

Decision of Rejection dated Sep. 11, 2012 received from the Japanese Patent Office from related Japanese Application No. 2010-170703 and U.S. Appl. No. 13/170,651, together with an English-language translation.

(Continued)

*Primary Examiner* — Kent Chang
*Assistant Examiner* — Nelson Rosario
(74) *Attorney, Agent, or Firm* — Scully, Scott, Murphy & Presser, PC (57) ABSTRACT

A method to control a communication device to communicate with a first external device in a first communication method and with a second external device in a second communication method being different from the first communication method is provided. The method includes steps of determining prior to communicating in the first communication method whether the communication device is set to communicate in the second communication method, switching the communication methods in the communication device from the second communication method to the first communication method when it is determined that the communication device is set to communicate in the second communication method, and communicating with the first external device in the first communication method after switching the communication methods.

15 Claims, 7 Drawing Sheets

FOREIGN PATENT DOCUMENTS

| | | |
|---|---|---|
| JP | 2002-175226 | 6/2002 |
| JP | 2004-172882 | 6/2004 |
| JP | 2004-180225 | 6/2004 |
| JP | 2004-334837 | 11/2004 |
| JP | 2007-306510 | 11/2007 |
| JP | 2008-67184 | 3/2008 |
| JP | 2008-252894 | 10/2008 |
| JP | 2008-271400 | 11/2008 |
| JP | 2008-271800 | 11/2008 |

OTHER PUBLICATIONS

Official Action, together with English language translation, dated Apr. 17, 2012 received from the Japanese Patent Office.

Notification of Reasons for Rejection dated Jun. 12, 2012 received from the Japanese Patent Office from related Japanese Application No. 2010-170703 and U.S. Appl. No. 13/170,651, together with an English-language translation.

* cited by examiner

COMMUNICATION CONTROLLING METHOD, COMPUTER READABLE MEDIUM, AND COMMUNICATION DEVICE

CROSS REFERENCE TO RELATED APPLICATION

This application claims priority from Japanese Patent Applications No. 2010-167162, filed on Jul. 26, 2010, the entire subject matters of which are incorporated herein by reference.

BACKGROUND

1. Technical Field

An aspect of the present invention relates to a method to control a communication device, which can communicate with other devices in two or more different communication technologies.

2. Related Art

A communication system having a server and a mobile communication device is known. The mobile device may transmit printable data to the server, and the server may manipulate the printable data to print an image. Whilst the server may support a plurality of communication methods such as IEEE 802.11x (Wi-Fi, registered trademark), Bluetooth (registered trademark), and dialup connection, the server may communicate with the mobile device in one of the plurality of communication methods. When the server detects the mobile device, the server determines the communication method to use to communicate with the mobile device and prints the image when the printable data is received from the mobile device in the determined communication method.

SUMMARY

Meanwhile, the communication device may also support a plurality of communication methods and selectively use one of the methods to communicate with an external device depending on various communication conditions, such as a communication task and a type of the external device. In this regard, although the communication device may communicate with an external device in one of the communication methods and with another external device in another one of the communication methods, the communication device may not necessarily be enabled to establish communication with the plurality of external devices in the different communication methods in parallel simultaneously. Rather, in many cases, the communication device is allowed to communicate with solely one of the external devices in one of the communication methods at a time. Therefore, in a conventional communication device, when the communication device in middle of communication with one external device in one of the communication methods is urged to communicate with another external device in a different one of the communication methods, a user of the communication device is required to manually switch the communication settings of the communication method, and a procedure to switch the communication settings may be complicated or bothersome.

In view of the above inconvenience, the present invention is advantageous in that a method to moderate or resolve the inconvenience is provided.

According to an aspect of the present invention, a method to control a communication device to communicate with a first external device in a first communication method and with a second external device in a second communication method being different from the first communication method is provided. The method includes steps of determining prior to communicating in the first communication method whether the communication device is set to communicate in the second communication method, switching the communication methods in the communication device from the second communication method to the first communication method when it is determined that the communication device is set to communicate in the second communication method, and communicating with the first external device in the first communication method after switching the communication methods.

According to another aspect of the present invention, a non-transitory computer readable medium storing computer readable instructions to control a communication device, which is capable of communicating with a first external device in a first communication method and with a second external device in a second communication method being different from the first communication method, is provided. The computer readable instructions include steps of determining prior to communicating in the first communication method whether the communication device is set to communicate in the second communication method, switching the communication methods in the communication device from the second communication method to the first communication method when it is determined that the communication device is set to communicate in the second communication method, and communicating with the first external device in the first communication method after switching the communication methods.

According to another aspect of the present invention, a communication device, which is capable of communicating with a first external device in a first communication method and with a second external device in a second communication method being different from the first communication method, is provided. The communication device includes a determining unit, which is configured to determine prior to communicating in the first communication method whether the communication device is set to communicate in the second communication method, a switching unit, which is configured to switch the communication methods in the communication device from the second communication method to the first communication method when the determining unit determines that the communication device is set to communicate in the second communication method, and a communicating unit, which is configured to communicate with the first external device in the first communication method after the switching unit switches the communication methods.

DETAILED DESCRIPTION

Hereinafter, an embodiment of the present invention will be described with reference to the accompanying drawings. Firstly, an overall configuration of a communication system 1 according to the present embodiment will be described with reference to FIG. 1. The communication system 1 according to the present embodiment includes a mobile phone 10, a printer 20, and a web server 40.

Figure 1:
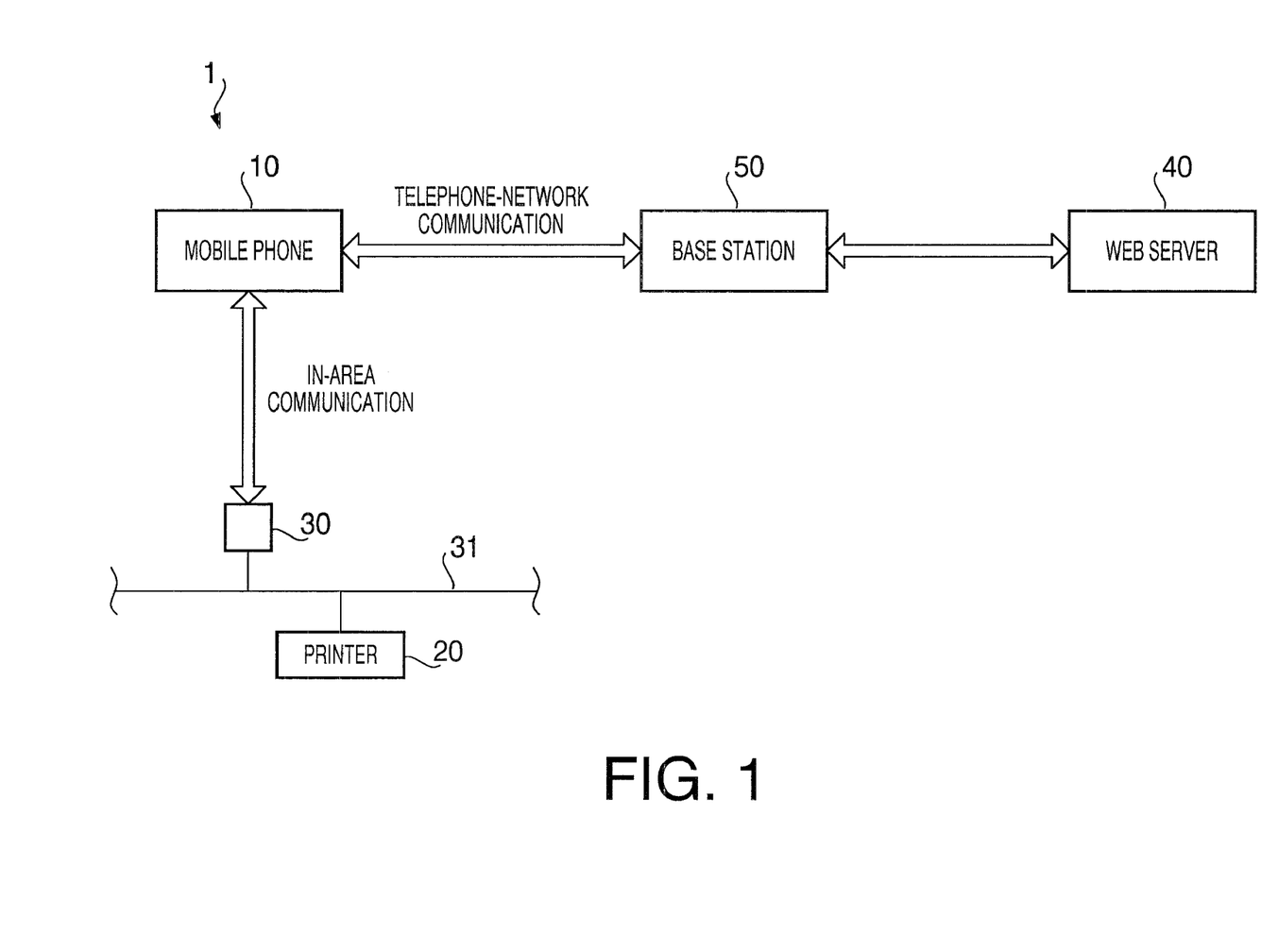
FIG. 1 is a diagram to illustrate a communication system having a mobile phone and external devices according to an embodiment of the present invention.

The mobile phone 10 is equipped with a telephone-calling function, which enables a user of the mobile phone 10 to speak with a different telephone user on the other end of line, and a wireless data-exchange function, which enables the mobile phone 10 to exchange data wirelessly with a different device. The wireless data exchange with the different device can be conducted in one of a plurality of different communication methods. Therefore, for example, the mobile phone 10 is wirelessly connectable with the printer 20 in one communication method and with the web server 40 in a different communication method. According to the present embodiment, the mobile phone 10 communicates with the printer in in-area communication and with the web server 40 in telephone-network communication.

The in-area communication is a data communication method to connect different network-enabled devices within a specific coverage area exclusively and includes, for example, Wi-Fi, Bluetooth, infrared wireless communication (IrDA), and LAN (local area network).

The telephone-network communication is a communication method to use a telephone line for the mobile phone 10 and includes, for example, WCDMA (wideband code division multiple access). The mobile phone 10 is capable of communicate with the device (e.g., the web server 40) outside the specific coverage area via a base station 50 by using the telephone-network communication.

When the mobile phone 10 is set to communicate in in-area communication, the mobile phone 10 cannot communicate with a device (e.g., the web server 40) outside the coverage area. However, the mobile phone 10 may communicate with the device outside the coverage area (e.g., the web server 40) when the in-area device (e.g., the printer 20) being connected with the mobile phone 10 is connectable with PSTN (public switched telephone network) (e.g., the Internet).

Figure 2:
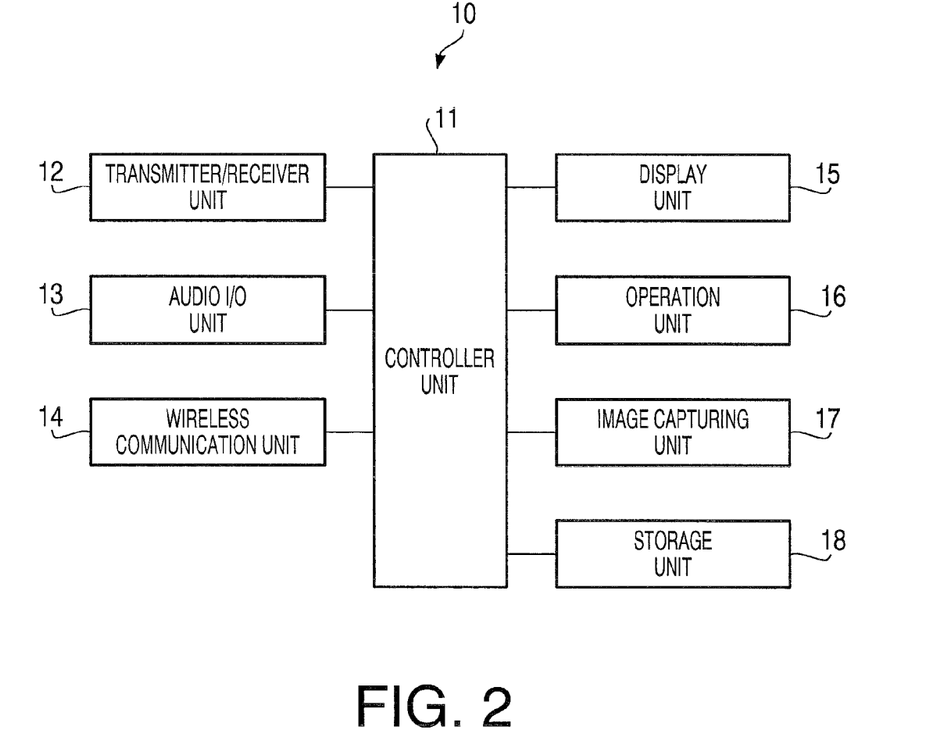
FIG. 2 is a block diagram to illustrate an electrical configuration of the mobile phone according to the embodiment of the present invention.

Next, an electrical configuration of the mobile phone 10 will be described with reference to FIG. 2. The mobile phone 10 includes a controller unit 11, a transmitter/receiver unit 12, an audio I/O unit 13, a wireless communication unit 14, a display unit 15, an operation unit 16, an image capturing unit 17, and a storage unit 18.

The controller unit 11 includes an application processor, a ROM, and a RAM, which are not shown in the drawings. The application processor executes programs stored in the ROM and the storage unit 18 to control behaviors of the mobile phone 10. The ROM stores the programs to be executed by the application processor and data to be used in the programs. The RAM provides a work area for the application processor executing the programs.

The transmitter/receiver unit 12 includes an antenna, a radio frequency circuit, and a baseband processor, which are not shown in the drawings. The transmitter/receiver unit 12 exchanges audio signals with the base station 50 via the antenna. Further, the transmitter/receiver unit 12 can exchange data packets with the base station in the telephone-network communication.

The audio I/O unit 13 includes a microphone, a speaker, and a sound processing circuit, which are not shown in the drawings. Sound inputted through the microphone is converted into audio signals, and the audio signals are transmitted to the base station 50 by the transmitter/receiver unit 12. Audio signals received from the base station 50 in the transmitter/receiver unit 12 are converted into sound and outputted through the speaker.

The wireless communication unit 14 enables the in-area communication between the mobile phone 10 and the printer 20 in the specific coverage area. In particular, whilst the mobile phone 10 is wirelessly connected to a communication network 31 via an access point being a connection point, such as a wireless LAN router 30 (see FIG. 1), the mobile phone 10 and the printer 20 can communicate with each other in an infrastructure mode. According to the present embodiment, however, the devices in the specific coverage area may not necessarily communicate in the infrastructure mode but directly communicate with each other in an ad-hoc mode without being relayed by the wireless LAN router 30.

The display unit 15 includes a display device (e.g., a liquid crystal display and an organic EL display) and a driving circuit to drive the display device, which are not shown in the drawings.

The operation unit 16 includes a touch-sensitive panel, which is arranged on a surface of the display device to detect a user's input, a controller to control operations in the touch-sensitive panel, and buttons to be pressed by the user, which are not shown in the drawings. The user may use the operation unit 16 to input information (e.g., a telephone number) and manipulate the operations in the mobile phone 10.

The image capturing unit 17 includes an area-image sensor, an optical system, an analog front-end unit, and an image processor, which are not shown in the drawings. The image capturing unit 17 captures an image and generates a digital image based on the captured image. The digital image may be stored in the storage unit 18 and/or transmitted to an external device by the transmitter/receiver unit 12.

The storage unit 18 is a non-volatile memory, such as a flash memory, and stores programs to be executed in the mobile phone 10 and information to be used in the programs. The storage unit 18 may store, for example, an operating system (OS) of the mobile phone 10, a communication controlling program, which will be described below, application programs to be executed in the mobile phone 10, and data to be used in the application programs.

Figure 3:
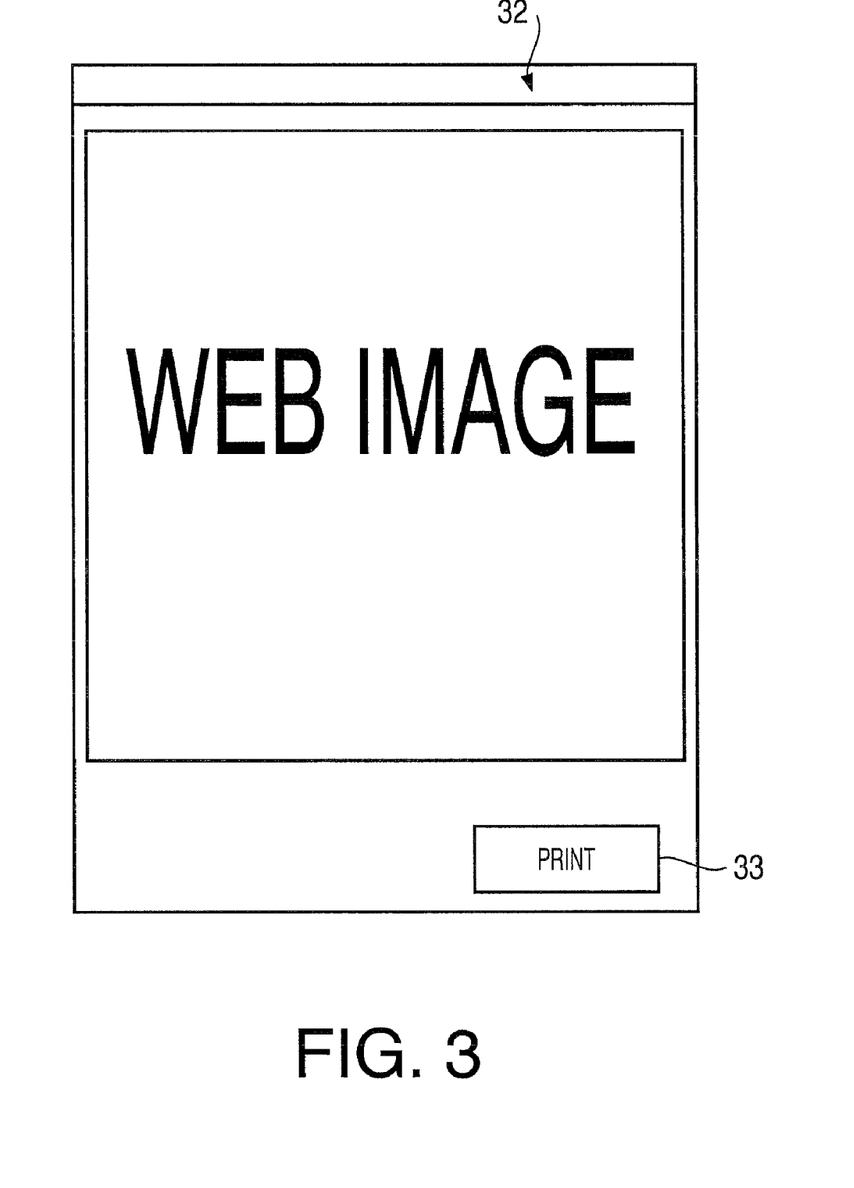
FIG. 3 is an illustrative view of a web-browser screen to be displayed in the mobile phone to communicate with a printer in the communication system according to the embodiment of the present invention.

Next, the communication controlling program to be run in the mobile phone 10 will be described with reference to FIGS. 3 and 4. The communication controlling program is a printing application program and controls the mobile phone 10 to convert source data into a printable format to be processed by the printer 20 and transmit the print data to the printer 20. Further, whilst the mobile phone 10 is set to communicate in either one of the in-area communication and the telephone-network communication, the communication controlling program can manipulate the controller unit 11 of the mobile phone 10 to switch the communication method to the other of the in-area communication and the telephone-network communication. In the present embodiment, the mobile phone 10 communicates with the printer 20 in the in-area communication method.

Therefore, in the present embodiment, the mobile phone 10 having been set to communicate in the telephone-network communication in advance is switched to communicate in the in-area communication in a communication controlling flow (see FIG. 4) when the mobile phone 10 transmits the print data to the printer 20.

Before switching the communication settings, for example, the user may operate the mobile phone 10 to access the web server 40 in the telephone-network communication to obtain a web image through a web browser of the mobile phone 10. More specifically, when the user accesses the web server 40, a web-browser screen 32 (see FIG. 3) including the web image is displayed in the display device of the display unit 15. Alternatively, the web-browsing function may be provided to the communication controlling program, and the user may activate the web browser within the communication controlling program.

The web-browser screen 32 displayed in the display unit 15 includes a print button 33, which is to be pressed by the user when the user enters an instruction to print the web image appearing in the web-browser screen 32 through the mobile phone 10. More specifically, when the user handles the operation unit 16 to press the print button 33 in the web-browser screen 32, the print instruction is entered, and the controller unit 11 creates print data (e.g., PDL data) based on the web image appearing in the web-browser screen 32. When the print data is created, the communication controlling flow is activated in the mobile phone 10 to transmit the created print data in the in-area communication.

As the communication controlling flow is activated, in S1, the controller unit 11 determines as to whether the mobile phone 10 has been set to communicate in the telephone-network communication prior to starting the in-area communication. The determination can be made, for example, by referring to configuration information stored in the storage unit 18. In this regard, in order to be determined that the mobile phone 10 is set to communicate in the telephone-network communication, the transmitter/receiver unit 12 may not necessarily be accessing the web server 40. Rather, it may be preferable to determine that the mobile phone 10 is set to communicate in the telephone-network communication not only when the transmitter/receiver unit 12 is actually accessing the web server 40 but also is accessible to the web server 40.

For example, after the web-browser screen 32 is obtained in the mobile phone 10, the user may handle the mobile phone 10 in predetermined procedure to release the mobile phone 10 from the telephone-network communication with the web-browser screen 32 maintained in the display unit 15. Thus, when the user presses the print button 33 in the web-browser screen 32 being maintained in the display unit 15 whilst the mobile phone 10 is released from the telephone-network communication, the controller unit 11 determines that the mobile phone 10 is not set to communicate in the telephone-network communication (S1: NO). The flow proceeds to S10. In S10, the controller unit 11 sets the communication method of the mobile phone 10 to the in-area communication and transmits the created print data to the printer 20 via the communication network 31. The flow ends thereafter. The printer 20 receiving the print data executes a printing operation according to the print data to print the web image on, for example, a sheet of paper.

Meanwhile, after the web-browser screen 32 is obtained in the mobile phone 10, and when the user presses the print button 33 in the web-browser screen 32 without releasing the mobile phone 10 from the telephone-network communication, in S1, the controller unit 11 determines that the mobile phone 10 is set to communicate in the telephone-network communication (S1: YES), and the flow proceeds to S2. In S2, the controller unit 11 activates a flow of access point determination (see FIG. 5).

Figure 5:
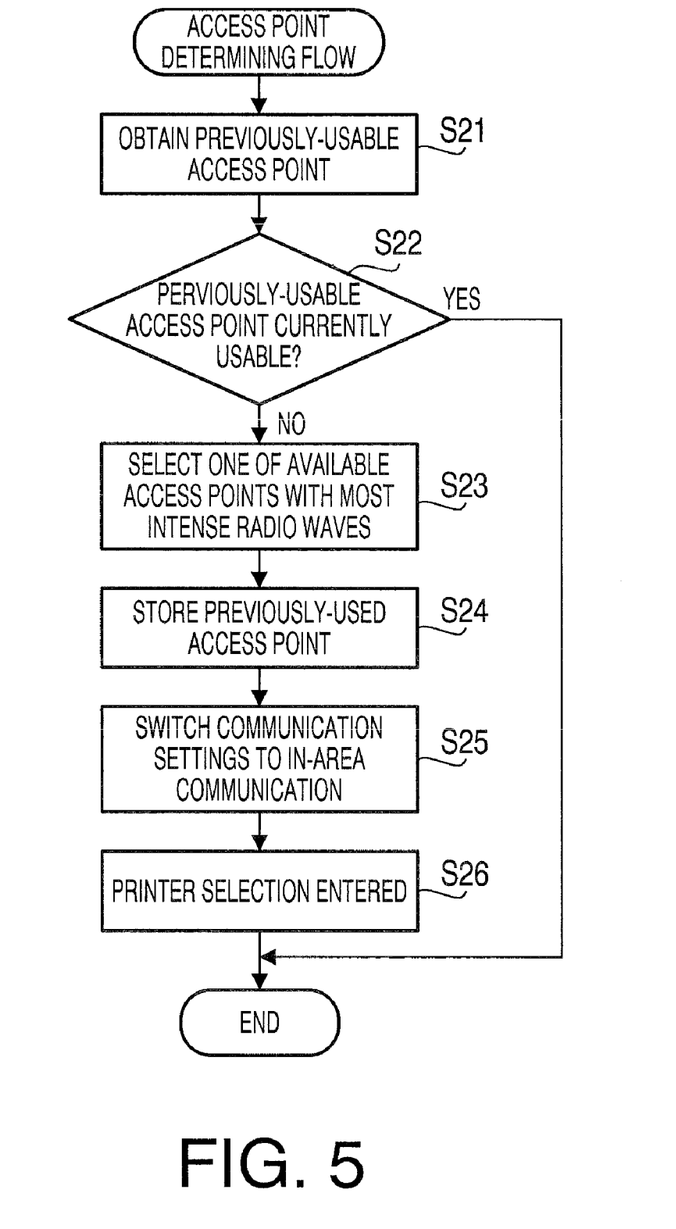
FIG. 5 is a flowchart to illustrate an access point determining flow to run in the mobile phone according to the embodiment of the present invention.

As the access point determining flow starts, in S21, the controller unit 11 refers to, for example, a record of past communication stored in the storage unit 18 and obtains an access point 30 which was used in previous communication from the record. Thereafter, in S22, the controller unit 11 determines as to whether the access point 30 obtained in S22 is currently usable. For example, the controller unit 11 may determine that the previously-usable access point 30 is still usable when intensity of radio waves from the previously-usable access point 30 is higher than a predetermined level.

When the controller unit 11 determines that the previously-usable access point 30 is still usable (S22: YES), the controller unit 11 determines the previously-usable access point to be a current access point 30, which is to be used in the current in-area communication. The flow ends thereafter and returns to the communication controlling flow (see FIG. 4). In this regard, the controller unit 11 also selects a previously-usable printer 20, which was used along with the previously-usable access point 30 in the previous in-area communication with the mobile phone 10, to be a printer 20 to be used in the current in-area communication.

It is to be noted, unless condition to use the mobile phone 10 has been changed, it is likely that the previously-usable access point 30 is operable normally. In other words, usability of the previously-usable access point 30 at least in the past is recognized. Therefore, when the previously-usable access point 30 is provided as a first option, that is, when the controller unit 11 selects the previously-usable access point 30 preferentially over other available access points, it is likely that the in-area communication is promptly established between the mobile phone 10 and the previously-usable access point 30.

In S22, meanwhile, when the controller unit 11 determines that the previously-usable access point 30 is not usable any more (S22: NO), in S23, the controller unit 11 selects one of available access points, of which radio waves are detected to be most intense, to be a current access point to be used in the current in-area communication. Thus, the access point with most intense radio waves is determined to be used in the current in-area communication. More specifically, the controller unit 11 extracts available access points, of which radio waves are more intense than a predetermined level, and selects one access point with the most intense radio waves amongst the available access points. Alternatively, the user may select one of the available access points according to his/her preference. The flow proceeds to S24.

Figure 6:
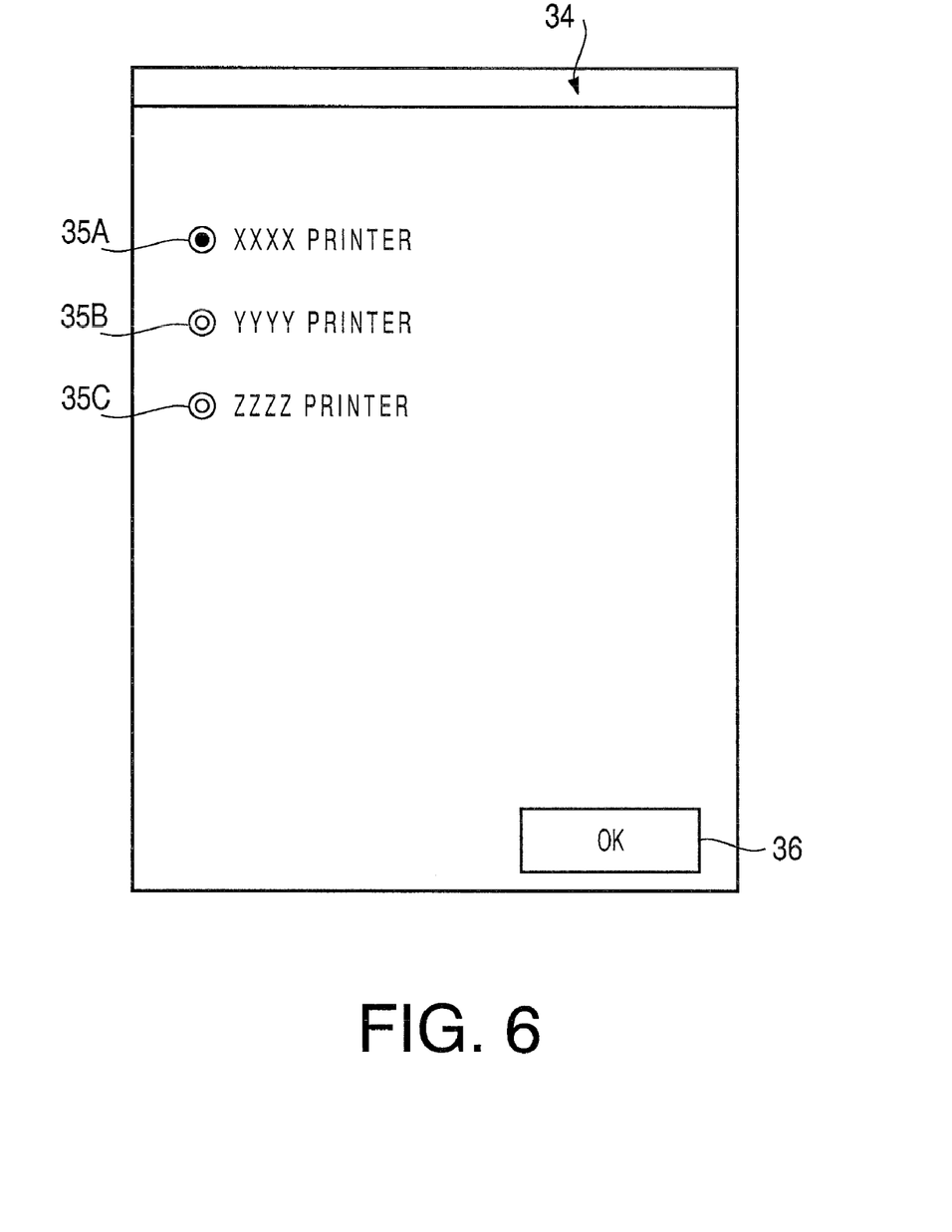
FIG. 6 is an illustrative view of a printer selectable screen to be displayed in the mobile phone according to the embodiment of the present invention.

In S24, the controller unit 11 determines the selected available access point 30 to be a previously-used access point and stores the previously-used access point in the storage unit 18. In S25, the controller unit 11 switches the communication methods from the telephone-network communication to the in-area communication. In S26, the controller unit 11 allows the user to select a printer to be used in the current in-area communication. More specifically, the controller unit 11 displays a printer selectable screen 34, which shows options of available printers with radio buttons 35A, 35B, 35C, in the display unit 15. The options of available printers shown in the printer selectable screen 34 include one or more available printers, including the printer 20 (see FIG. 1), which can communicate with the mobile phone 10 in the in-area communication via the previously-used access point 30 stored in the storage unit 18 in S24.

In S26, when the user handles the operation unit 16 to press to select one of the radio buttons 35A-35C and press an OK button 36, the controller unit 11 reserves the selected printer (e.g., the printer 20) in the storage unit 18. The flow ends thereafter and returns to the communication controlling flow (see FIG. 4). In S26, alternatively, upon selection of a printer, the controller unit 11 may obtain information concerning locations of the available printers and automatically select one of the available printers being in a nearest location from the mobile phone 10. The automatically selected printer may be informed to the user through the display unit 15.

The flow returns to the communication controlling flow (see FIG. 4) and proceeds to S3. In S3, the controller unit 11 switches the communication methods from the telephone-network communication to the in-area communication. In S3, if the communication method has been changed to the in-area communication in S25 in the access point determining flow (see FIG. 5), the controller unit 11 maintains the setting. In S4, the controller unit 11 examines condition of the printer 20 selected in S26 in the access point determining flow. More specifically, the controller unit 11 manipulates the wireless communication unit 14 to obtain information concerning the condition of the printer 20. The information concerning the condition of the printer 20 is used by the controller unit 11 to judge as to whether the printer 20 is operable and includes, for example, error information indicating paper jam, running out of consumable materials such as toner and paper, and failure in a printing operation.

In S5, the controller unit 11 judges based on the information concerning the condition as to whether the selected printer 20 is operable. When the controller unit 11 determines that the selected printer 20 is inoperable (S5: NO), in S6, the controller unit 11 cancels the communication setting of in-area communication and releases the mobile phone 10 from the in-area communication setting. Therefore, when the user handles the operation unit 16 to manually enter an access-server instruction, which is an instruction for the mobile phone 10 to access the web server 40, the mobile phone 10 is enabled to access the web server 40 in the telephone-network communication. Thus, the user can, for example, obtain another web image from the web server 40 whilst the mobile phone 10 cannot establish in-area communication with the printer 20. Therefore, when the selected printer 20 is in inoperable condition and communication in the in-area communication cannot be established with the selected printer 20, the inoperable communication setting can be prevented from being maintained unnecessarily. According to the present invention, in S5, the controller unit 11 may also determine that the selected printer 20 is inoperable when the controller unit 11 cannot obtain the information concerning condition of the printer 20 being, for example, powered off.

Further, in S5, the controller unit 11 may voluntary and automatically switch the communication settings from the in-area communication back to the telephone-network communication regardless of the access-server instruction from the user when the selected printer 20 is determined to be inoperable (S5: NO). However, with the former configuration, in which the controller 11 switches the communication setting to the telephone-network communication upon entry of the access-server instruction, processing load on the controller unit 11 for switching may be prevented or lowered until the access-server instruction is entered.

In S7, the controller unit 11 waits for a first predetermined period of time starting from the cancellation of the in-area communication. The first predetermine period of time may be, for example, 10 seconds. After the first predetermined period of time, the flow returns to S3, in which the controller unit 11 switches the communication settings from the telephone-network communication to the in-area communication, and repeats S3-S5. With the repeated flow of S3-S5, the mobile phone 10 can be provided with an opportunity to establish communication with the printer 20 in the in-area communication to complete the transmission of the print data when the printer recovers in operable condition in S5-S8. The flow including S5-S8 will be described below.

In S5, when the controller unit 11 determines that the selected printer is operable (S5: YES), in S8, the controller unit 11 activates a flow of print data transmission (see FIG. 7), in which the print data representing the image in the web-browser screen 32 is sequentially transmitted to the printer 20.

Figure 7:
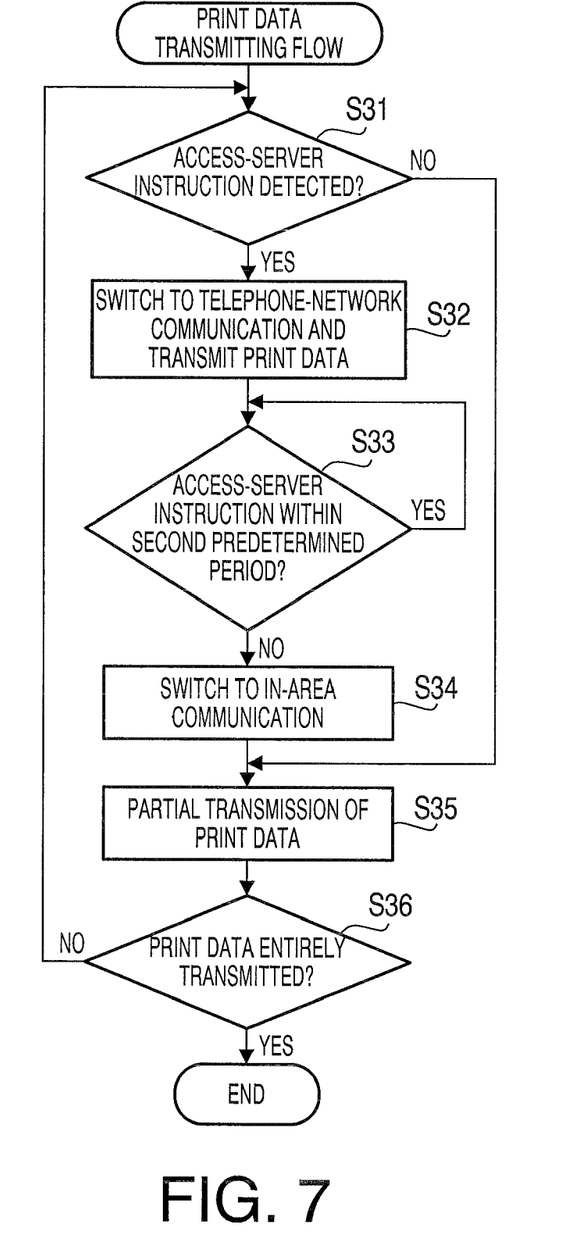
FIG. 7 is a flowchart to illustrate a print data transmitting flow to run in the mobile phone according to the embodiment of the present invention.

When the print data transmitting flow starts, in S31, the controller unit 11 judges as to whether an access-server instruction has been detected. If no access-server instruction has been detected (S31: NO), the flow proceeds to S35. In S35, the controller unit 11 transmits a divided part of the print data representing the image to the selected printer in the in-area communication via the previously-used access point 30 stored in the storage unit 18 in S24 (see FIG. 5). In S36, the controller unit 11 examines as to whether transmission of entire print data has been completed. If transmission of the entire print data has not been completed (S36: NO), the flow returns to S31.

In S31, if an access-server instruction has been detected (S31: YES), in S32, the controller unit 11 suspends transmission of the print data in the in-area communication and restores the communication settings from the in-area communication back to the telephone-network communication in order for the mobile phone 10 to access the web server 40 in the telephone-network communication. Thus, upon detection of the access-server instruction, the mobile phone 10 can access the web server 40 in the telephone-network communication preferentially over the data transmission in the in-area communication. Whilst the mobile phone 10 can access the web server 40 preferentially over the data transmission in the in-area communication, for example, the mobile phone 10 can obtain additional images through the web browser, and the user can view the images whilst the data transmission in in-area communication is suspended. The flow proceeds to S33.

In S33, the controller unit 11 examines as to whether another access-server instruction is entered within a second predetermined period of time starting from the switching of the communication settings to the telephone-network communication in S32. If another access-server instruction within the second predetermined period is detected (S33: YES), the controller unit 11 maintains the communication setting of the telephone-network communication. Meanwhile, if no access-server instruction is detected within the second predetermined period in S33 (S33: NO), in S34, the controller unit 11 switches in retry the communication settings from the telephone-network communication to the in-area communication. Thereafter, in S35, the controller unit 11 transmits another part of the divided print data to the selected printer 20 in the in-area communication. Thus, when the user does not enter an access-web instruction, the communication settings are switched to the in-area communication, and transmission of the print data to the selected printer 20 in the in-area communication is automatically resumed. The flow proceeds to S36.

In S36, the controller unit 11 examines as to whether transmission of the entire print data has been completed. If transmission of the entire print data has been completed (S36: YES), the flow ends and returns to the communication controlling flow (see FIG. 4). In the communication controlling flow, the controller unit 11 proceeds to S9, in which the controller unit 11 cancels the communication setting of the in-area communication. Thereby, the mobile phone 10 is allowed to access the web server 40 in telephone-network communication upon entry of an access-server instruction from the user. Accordingly, after completion of the entire print data transmission, the mobile phone 10 is released from the communication setting of the in-area communication and can be prevented from being maintained in the in-area communication setting unnecessarily. Therefore, upon entry of an access-server instruction, the mobile phone 10 can smoothly access the web server 40 in the telephone-network communication. The communication controlling flow ends after cancellation of the in-area communication setting in S9.

According to the behaviors of the controller unit 11 in the mobile phone 10, the communication settings are automatically switched from the telephone-network communication to the in-area communication before starting the communication in the in-area communication setting when the mobile phone 10 has been set to communicate in telephone-network communication. Therefore, inconvenience to manually switch the communication settings from telephone-network communication to in-area communication can be moderated or resolved.

Although an example of carrying out the invention has been described, those skilled in the art will appreciate that there are numerous variations and permutations of the communication controlling method and the communication device that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the mobile phone 10 may be replaced with any communication-enabled device, as long as the communication device is capable of communicating in a plurality of different communication settings, such as a mobile computer, a desktop computer, an internet printer or an internet facsimile having a communication function.

For another example, the printer 20 may be replaced with any external device, which can communicate with the mobile phone 10, such as a facsimile machine, a display device, an output device (e.g., a projector), and an input device (e.g., a scanner, a camera, etc.). In particular, for example, when a user creates a web page using a computer, which is accessing the web server 40 in telephone-network communication (e.g., the Internet) and is connectable with a scanner in in-area network, the computer may effectively switch the communication settings from the telephone-network to the in-area network in order to obtain an image to be included in the web page from the scanner.

In the embodiment of the present invention, the mobile phone 10 is wirelessly connected with the printer 20 in the in-area communication and with the web server 40 in the telephone-network communication. However, at least one of the connections may be replaced with wired communication as long as the plurality of communication settings are different from each other, and the mobile phone 10 is not capable of establishing parallel connections with the external devices in the plurality of different communication settings simultaneously. Further, a number of the plurality of different communication settings may be three or more.

In the embodiment of the present invention, once the communication settings are switched from the telephone-network communication to the in-area communication and during the print data transmitting flow, upon detection of the access-server instruction, the communication settings are switched from the in-area communication to the telephone-network communication. However, the communication settings may not necessarily be switched based on detection of the access-server instruction. For example, the in-area communication may be maintained regardless of entry of the access-server instruction. With the in-area communication being maintained, data transmission in the in-area communication can be continued preferentially over the telephone-network communication.

Figure 4:
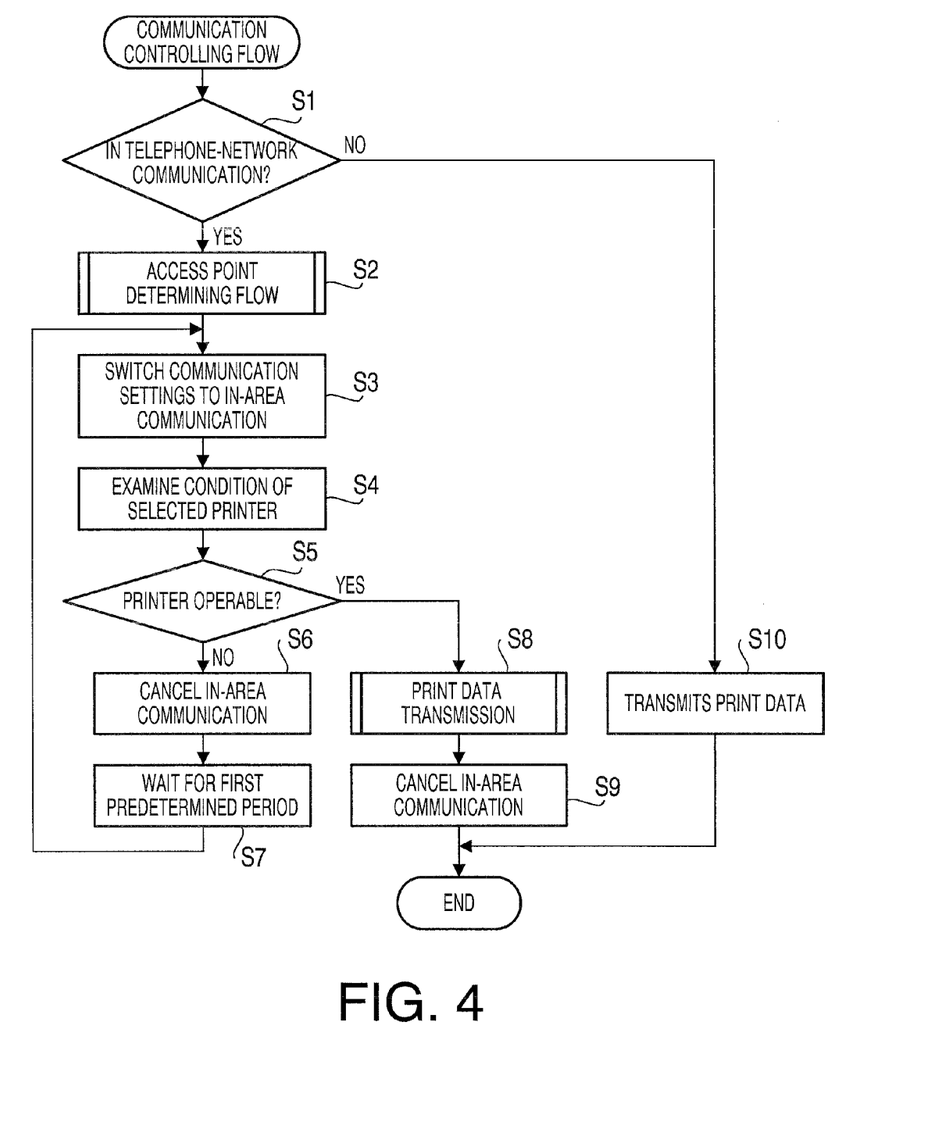
FIG. 4 is a flowchart to illustrate a communication controlling flow to run in the mobile phone according to the embodiment of the present invention.

For another example, the steps in the communication controlling flow, the access-point determining flow, and the print data transmitting flow shown in FIGS. 4, 5, and 7 may not necessarily be executed by a single application processor, i.e., the controller unit 11, but at least a part of the steps may be executed by a different application processor or a dedicated processing circuit (e.g., ASIC).

What is claimed is:

1. A method to control a communication device to communicate with a first external device, the first external device being a printing device in an in-area communication method configured to communicate with network-enabled devices exclusively within a specific coverage area, and with a second external device in a telephone-network communication method configured to communicate with a device outside the specific coverage area using a telephone-network communication, comprising steps of:

determining prior to communicating in the in-area communication method whether the communication device is set to communicate in the telephone-network communication method;

switching the communication methods in the communication device from the telephone-network communication method to the in-area communication method when it is determined that the communication device is set to communicate in the telephone-network communication method, wherein the step of switching the communication methods from the telephone-network communication method to the in-area communication method is completed automatically;

communicating with the first external device in the in-area communication method after switching the communication methods; and switching the communication methods in the communication device from the in-area communication method back to the telephone-network communication method automatically, after the communication with the first external device is completed;

wherein the step of determining prior to communicating in the in-area communication method, is completed without releasing communication between the communication device and the second external device wherein, in the step of communicating with the first external device, while a part of data being print data is transmitted from the communication device to the first external device in the in-area communication method, when an instruction for accessing the device outside the specific coverage area is received, the communication device switches the communication methods from the in-area communication method to the telephone-network communication method to access the device outside the specific coverage area, and after switching, if no further instruction for accessing the device outside the specific coverage area is received for a predetermined length of period, the communication methods are switched from the telephone-network communication method to the in-area communication method, and a remaining part of the print data is transmitted to the first external device in the in-area communication method to have the print data printed by the first external device.

2. The method according to claim 1, further comprising a step of:
cancelling the setting of the in-area communication method in the communication device after completion of the communication with the first external device in the in-area communication method.

3. The method according to claim 1, wherein the step of communicating with the first external device in the in-area communication method further includes steps of:
obtaining information concerning condition of the first external device;
judging operability of the first external device based on the obtained information; and
activating communication with the first external device in the in-area communication method when it is judged that the first external device is in an operable condition.

4. The method according to claim 3, wherein the step of communicating with the first external device in the in-area communication method further includes a step of:
switching the communication methods in the communication device from the in-area communication method back to the telephone-network communication method when it is judged based on the obtained information that the first external device is in an inoperable condition.

5. The method according to claim 4, wherein the step of communicating with the first external device in the in-area communication method further includes a step of:
repeating, after switching the communication methods in the communication device back to the telephone-network communication method, the steps of obtaining the information concerning condition of the first external device and judging operability of the first external device based on the obtained information to switch the communication methods in the communication device from the telephone-network communication method to the in-area communication method after the judgment that the first external device is in the operable condition.

6. The method according to claim 1, further comprising steps of:
detecting whether a communication instruction, which is an instruction for the communication device to communicate with the second external device in the telephone-network communication method, is inputted by a user of the communication device; and
restoring the communication methods in the communication device from the in-area communication method back to the telephone-network communication method when the communication instruction is detected whilst the in-area communication method is set in the communication device.

7. The method according to claim 6, further comprising a step of:
switching in retry, after restoring the communication methods from the in-area communication method back to the telephone-network communication method, the communication methods in the communication device from the telephone-network communication method to the in-area communication method when no communication instruction is detected within a predetermined period in the step of detecting.

8. The method according to claim 6, further comprising a step of:
maintaining, after determination that the communication device is set to communicate in the telephone-network communication method and after switching the communication methods from the telephone-network communication method to the in-area communication method, the in-area communication method set in the communication device regardless of input of the communication instruction by the user.

9. The method according to claim 1, further comprising steps of:
storing a used connection point, which is used to connect the communication device with the first external device in the step of communicating with the first external device in the in-area communication method, in a storage unit of the communication device,
wherein, in the step of switching the communication methods, a previously-used connection point, which was used and stored in the storage unit of the communication device in previous communication in the in-area communication method, is selected preferentially over other available connection points to be used to connect the communication device with the first external device.

10. The method according to claim 1, further comprising:
executing the step of switching the communication methods in the communication device from the in-area communication method back to the telephone-network communication method automatically, after sending a print data transmission to the first external device is completed.

11. The method according to claim 1, wherein the telephone-network communication method remains accessible to the communication device during the switching of the communication methods.

12. The method according to claim 1, wherein the in-area and telephone-network communication methods are different communication networks.

13. The method according to claim 1, wherein the in-area communication method is a method for communicating with the first external device via a first network; and
wherein the telephone-network communication method is a method for communicating with the second external device via a second network.

14. A non-transitory computer readable medium storing computer readable instructions to control a communication device, which is capable of communicating with a first external device, the first external device being a printing device in an in-area communication method configured to communicate with network-enabled devices exclusively within a specific coverage area, and with a second external device in a telephone-network communication method configured to communicate with a device outside the specific coverage area using a telephone-network communication, comprising steps of:
determining prior to communicating in the in-area communication method whether the communication device is set to communicate in the telephone-network communication method;
switching the communication methods in the communication device from the telephone-network communication method to the in-area communication method when it is determined that the communication device is set to communicate in the telephone-network communication method, wherein the step of switching the communication methods from the telephone-network communication method to the in-area communication method is completed automatically;
communicating with the first external device in the in-area communication method after switching the communication methods; and switching the communication methods in the communication device from the in-area communication method back to the telephone-network communication method automatically, after the communication with the first external device is completed;

wherein the step of determining prior to communicating in the in-area communication method, is completed without releasing communication between the communication device and the second external device wherein, in the step of communicating with the first external device, while a part of data being print data is transmitted from the communication device to the first external device in the in-area communication method, when an instruction for accessing the device outside the specific coverage area is received, the communication device switches the communication methods from the in-area communication method to the telephone-network communication method to access the device outside the specific coverage area, and after switching, if no further instruction for accessing the device outside the specific coverage area is received for a predetermined length of period, the communication methods are switched from the telephone-network communication method to the in-area communication method, and a remaining part of the print data is transmitted to the first external device in the in-area communication method to have the print data printed by the first external device.

15. A communication device, which is capable of communicating with a first external device, the first external device being a printing device in an in-area communication method configured to communicate with network-enabled devices exclusively within a specific coverage area, and with a second external device in a telephone-network communication method configured to communicate with a device outside the specific coverage area using a telephone-network communication, comprising:

a determining unit, which is configured to determine prior to communicating in the in-area communication method whether the communication device is set to communicate in the telephone-network communication method;

a switching unit, which is configured to switch the communication methods in the communication device from the telephone-network communication method to the in-area communication method when the determining unit determines that the communication device is set to communicate in the telephone-network communication method, wherein the switching unit is configured to automatically switch the communication methods from the telephone-network communication method to the in-area communication method, and the switching unit is configured to automatically switch the communication methods from the in-area communication method back to the telephone-network communication method automatically, after the communication with the first external device is completed; and a communicating unit, which is configured to communicate with the first external device in the in-area communication method after the switching unit switches the communication methods;

wherein the determining unit completes the determination of whether the communication device is set to communicate in the telephone-network communication method, without releasing communication between the communication device and the second external device wherein, in the step of communicating with the first external device, while a part of data being print data is transmitted from the communication device to the first external device in the in-area communication method, when an instruction for accessing the device outside the specific coverage area is received, the communication device switches the communication methods from the in-area communication method to the telephone-network communication method to access the device outside the specific coverage area, and after switching, if no further instruction for accessing the device outside the specific coverage area is received for a predetermined length of period, the communication methods are switched from the telephone-network communication method to the in-area communication method, and a remaining part of the print data is transmitted to the first external device in the in-area communication method to have the print data printed by the first external device.

* * * * *